(12) United States Patent
Jung et al.

(10) Patent No.: US 8,512,822 B2
(45) Date of Patent: Aug. 20, 2013

(54) RETARDATION FILM, METHOD FOR MANUFACTURING THE SAME, AND LIQUID CRYSTAL DISPLAY DEVICE INCLUDING THE SAME

(75) Inventors: Jae-Ho Jung, Chungcheongbuk-do (KR); Kum-Suek Seo, Cheongju-si (KR); Jong-Sung Park, Cheongju-si (KR)

(73) Assignee: LG Chem, Ltd., Seoul (KR)

(*) Notice: Subject to any disclaimer, the term of this patent is extended or adjusted under 35 U.S.C. 154(b) by 209 days.

(21) Appl. No.: 13/143,054

(22) PCT Filed: Jun. 24, 2010

(86) PCT No.: PCT/KR2010/004118
§ 371 (c)(1),
(2), (4) Date: Jun. 30, 2011

(87) PCT Pub. No.: WO2010/151065
PCT Pub. Date: Dec. 29, 2010

(65) Prior Publication Data
US 2011/0268895 A1    Nov. 3, 2011

(30) Foreign Application Priority Data
Jun. 24, 2009   (KR) .................... 10-2009-0056646

(51) Int. Cl.
*G02F 1/13363*    (2006.01)

(52) U.S. Cl.
USPC ........... 428/1.3; 428/1.33; 428/481; 349/118; 427/162

(58) Field of Classification Search
USPC ................. 428/1.3, 1.33, 481; 349/117–118; 427/162
See application file for complete search history.

(56) References Cited

U.S. PATENT DOCUMENTS

| | | |
|---|---|---|
| 7,083,835 B2 | 8/2006 | Elman et al. |
| 2005/0074564 A1 | 4/2005 | Yamaoka et al. |
| 2009/0096962 A1* | 4/2009 | Shelton et al. ............... 349/96 |
| 2010/0128206 A1 | 5/2010 | Kim et al. |

FOREIGN PATENT DOCUMENTS

| | | |
|---|---|---|
| JP | 2004-157300 | 6/2004 |
| JP | 2006-058322 | 3/2006 |
| KR | 10-2002-0020599 A | 3/2002 |
| KR | 10-2006-0054391 A | 5/2006 |
| KR | 10-2007-0003388 A | 1/2007 |
| KR | 10-2007-0113749 A | 11/2007 |
| KR | 10-2008-0004720 A | 1/2008 |
| KR | 10-2009-0043931 A | 5/2009 |
| KR | 10-2009-0057543 A | 6/2009 |
| WO | WO 2009/038342 | 3/2009 |

OTHER PUBLICATIONS

KIPO Website English Translation of KR 10-2009-0043931, Kim et al., May 7, 2009.*

* cited by examiner

*Primary Examiner* — Sophie Hon
(74) *Attorney, Agent, or Firm* — McKenna Long & Aldridge, LLP

(57) ABSTRACT

The present invention relates to a retardation film, a method for manufacturing the same, and a liquid crystal display device including the same. More particularly, the present invention relates to a retardation film that includes 1) an acryl-based film, and 2) a coating layer of a negative C type material, the retardation film according to the exemplary embodiment of the present invention may be applied to an IPS (in-plane switching) mode liquid crystal display, and it is possible to control a ratio of an in-plane retardation value and a thickness retardation value of the retardation film.

20 Claims, 3 Drawing Sheets

RETARDATION FILM, METHOD FOR MANUFACTURING THE SAME, AND LIQUID CRYSTAL DISPLAY DEVICE INCLUDING THE SAME

This application is a National Stage Entry of International Application No. PCT/KR2010/004118, filed Jun. 24, 2010, and claims the benefit of Korean Application No. 10-2009-0056646, filed on Jun. 24, 2009, which is hereby incorporated by reference for all purposes as if fully set forth herein.

TECHNICAL FIELD

The present invention relates to a retardation film, a method for manufacturing the same, and a liquid crystal display device including the same.

BACKGROUND ART

Recently, display technologies using various methods such as a plasma display panel (PDP), a liquid crystal display (LCD) and the like that replace a known Braun tube in accordance with the development of optical technologies are suggested and marketed, and a high level of characteristics are required for the polymer material for the display. For example, in the case of the liquid crystal display, according to the development toward the thin film, the lightness, and enlargement of the screen area, the wide viewing angle, the high contrast, the suppression of change in image color tone according to the viewing angle and the uniformity of the screen display are particularly considered as important problems.

Accordingly, various polymer films are used in a polarizing film, a retardation film, a plastic substrate, a light guide plate and the like.

There are various modes such as Double Domain TN (twisted nematic), STN (super twisted nematic), ASM (axially symmetric aligned microcell), OCB (optically compensated blend), VA (vertical alignment), MVA (multidomain VA), SE (surrounding electrode), PVA (patterned VA), IPS (in-plane switching), and FFS (fringe-field switching) modes in a liquid crystal display. Each mode has an intrinsic liquid crystal arrangement and optical anisotropy. Therefore, a compensation film of optical anisotropy corresponding to each mode is required in order to compensate retardation due to optical anisotropy of the liquid crystal mode.

An IPS mode of liquid crystal panel has a characteristic of wide viewing angle as compared to a known TN mode, and a STN mode. However, in the IPS mode, in a perpendicular direction of the panel, an almost complete black display can be implemented, but in the case when the panel is observed in a misaligned direction to the perpendicular direction, in a misaligned direction to an optical axis direction of the polarizing plate that is disposed at upper and lower parts of the liquid crystal cell, there is a problem in that light leakage inevitably occurs because of a characteristic of the polarizing plate. In addition, the panel size is being currently increased, and a color shift that was not considered as a problem in the related art becomes an issue.

In order to solve this, in the case of the IPS mode, since a liquid crystal that has a positive dielectric anisotropy is filled between the polarizing plates, an in-plane refractive index is more largely aligned than a thickness refractive index, such that a +C-plate type anisotropy film that has a thickness positive retardation is required as an optical compensation film.

Among the polymer materials, when the polymer chain is stretched and aligned, polycarbonate (PC) shows the optical anisotropy in which the in-plane refractive index is increased and has a negative thickness retardation, such that it is not desirable to apply it alone to an IPS mode, and polycarbonate is used as a (−) C-plate that is an optical film for compensating a viewing angle of a VA mode of liquid crystal display.

In general, a compensation film for IPS compensates the viewing angle by uniaxially stretching COP and coating a nematic liquid crystal that is a +C plate. However, in this case, since physical properties are excellent but birefringence of the liquid crystal is very high, even if the alignment and the coating thickness of the liquid crystal are slightly changed, the entire retardation of the compensation film is largely changed, such that it is difficult to control the retardation in the case of a thin film. In addition, since a manufacturing cost is increased because of a high cost of liquid crystal, it is disadvantageous in that it is difficult to commercialize it, and in the case of liquid crystal coating, since Tg is basically about 80C, there is a limit in use as a material for the current polarizing plate that requires high durability.

In addition, in the case of a known product using the liquid crystal, since an upward compensation characteristic is excellent but a downward compensation characteristic is relatively low, it is not suitable to apply it to a material that requires a characteristic of entirely sufficient compensation region.

Meanwhile, as an example of using a stretched acryl film, there are a multilayered structure (Korean Unexamined Patent Application Publication No. 2006-0054391), and an arylate coating layer (Korean Unexamined Patent Application Publication No. 2007-0003388), but since they are applied to a VA (vertical alignment) mode of liquid crystal display and application ranges of retardation values are different from each other, it could not be applied to an IPS (in-plane switching) mode of liquid crystal display.

As a patent relating to a compensation film for IPS, there are Korean Unexamined Patent Application Publication Nos. 2008-0004720 and 2006-0047433, in which a MMA-Styrene-MAH copolymer film is manufactured by uniaxial and biaxial stretching, a +C plate is manufactured, and a manufacturing cost can be reduced. However, in the case when a $N_z$ ($R_{th}/R_{in}$) value that is a ratio of a thickness retardation value to an in-plane retardation value is larger than or equal to 1, a viewing angle compensation is reduced as compared to the case when the above-mentioned liquid crystal is coated.

In practice, it is very difficult and impossible to set the $N_z$ ($R_{th}/R_{in}$) value that is the ratio of the thickness retardation value to the in-plane retardation value to be less than 1 by using only the stretched film.

DISCLOSURE

Technical Problem

The present invention has been made in an effort to provide a retardation film having a reduced decrease in downward compensation characteristic, which can be applied to a wide viewing angle IPS (in-plane switching) mode of liquid crystal display having advantages of no light leakage, no color shift, a upward compensation characteristic that is similar to a known level of compensation characteristic, and a relatively excellent downward compensation characteristic by appropriately controlling an in-plane retardation value and a thickness retardation value.

In addition, the present invention has been made in an effort to provide a retardation film that can be applied to a wide viewing angle IPS (in-plane switching) mode of liquid crystal display having advantages of remarkably reducing a decrease in durability that was a problem in liquid crystal coating in the case when a coating layer is formed of a negative C type material that is a high durable polymer material and reducing a cost because a known expensive liquid crystal is not used by using the negative C type material having cost competitiveness.

Technical Solution

An exemplary embodiment of the present invention provides a retardation film for an IPS (in-plane switching) mode liquid crystal display, which includes 1) an acryl-based film, and 2) a coating layer of a negative C type material that includes a repeating unit of the following Formula 1, wherein an in-plane retardation value that is represented by the following Equation 1 is 50 to 300 nm, a thickness retardation value that is represented by the following Equation 2 is 10 to 300 nm, and a $N_z(R_{th}/R_{in})$ value that is a ratio of the thickness retardation value to the in-plane retardation value is less than 1,

[Formula 1]

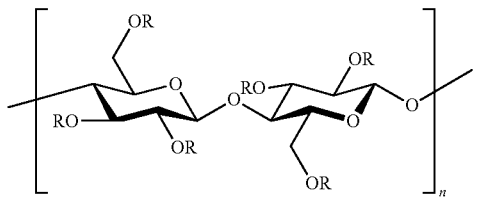

wherein Rs are the same as or different from each other, and each independently selected from —H, —CH$_3$, —CH$_2$CH(OH)CH$_3$, —CH$_2$CH$_2$OH, and —CH$_2$CH$_3$, and n is 100 to 300, $$R_{in}=(n_x-n_y)\times d \quad \text{[Equation 1]}$$

$$R_{th}=(n_z-n_y)\times d \quad \text{[Equation 2]}$$

Wherein $n_x$ is the refractive index in the direction in which the refractive index is the highest in the plane of the film, $n_y$ is the refractive index in the vertical direction in respects to $n_x$ in the plane of the film, $n_z$ is a thickness refractive index, and d is a thickness of the film.

Another exemplary embodiment of the present invention provides a method for manufacturing a retardation film for an IPS (in-plane switching) mode liquid crystal display, which includes a) preparing an acryl-based film, and b) coating a negative C type material that includes a repeating unit of the above Formula 1 on at least one side of the acryl-based film, wherein an in-plane retardation value that is represented by the above Equation 1 is 50 to 300 nm, a thickness retardation value that is represented by the above Equation 2 is 10 to 300 nm, and a $Nz(R_{th}/R_{in})$ value that is a ratio of the thickness retardation value to the in-plane retardation value is less than 1.

Yet another exemplary embodiment of the present invention provides a liquid crystal display device that includes the retardation film.

Advantageous Effects

According to the exemplary embodiments of the present invention, a retardation film can appropriately control an in-plane retardation value and a thickness retardation value, has an excellent viewing angle compensation effect because there are no light leakage and no color shift, and can be applied to an IPS (in-plane switching) mode of liquid crystal display.

Further, deterioration of a downward compensation characteristic can be reduced by relatively improving the downward compensation characteristic while maintaining an upward compensation characteristic at the same level as a known characteristic.

In addition, in the case when a coating layer is formed of a negative C type material that is a high durable polymer material, decrease in durability that was a problem in liquid crystal coating can be largely reduced, and a cost can be reduced because a known expensive liquid crystal is not used by using the negative C type material having a cost competitiveness.

BEST MODE

Figure 1:
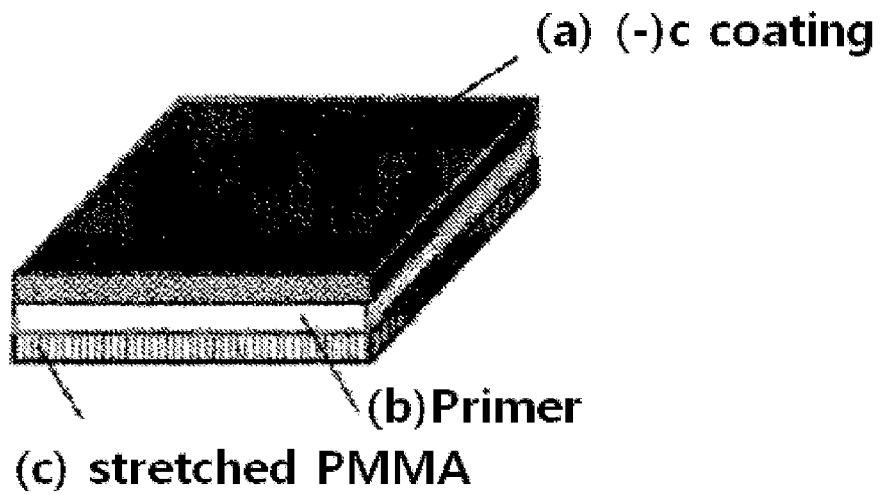
FIG. 1 is a view that illustrates a structure of a retardation film according to an exemplary embodiment of the present invention.
Figure 2:
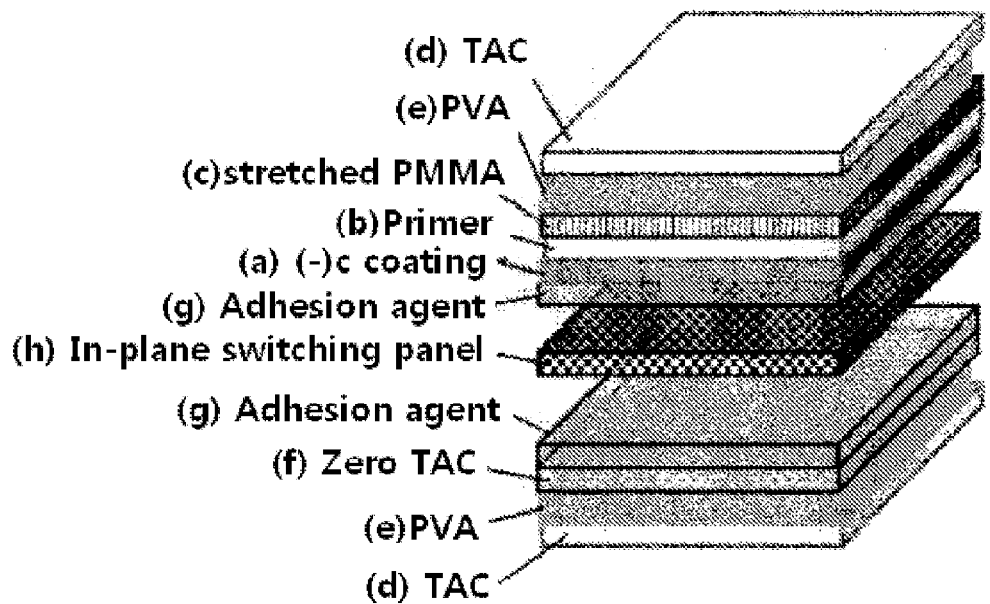
FIG. 2 is a view that illustrates a structure of a polarizing plate according to an exemplary embodiment of the present invention.

The retardation film according to an exemplary embodiment of the present invention includes 1) an acryl-based film, and 2) a coating layer of a negative C type material (refer to FIG. 1). Herein, the negative C type material that includes a repeating unit of the following Formula 1 is used as 2) the negative C type material.

[Formula 1]

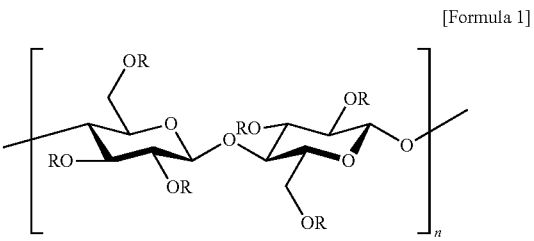

wherein

Rs are the same as or different from each other, and each independently selected from —H, —CH$_3$, —CH$_2$CH(OH)CH$_3$, —CH$_2$CH$_2$OH, and —CH$_2$CH$_3$, and n is 100 to 300.

In the retardation film according to the exemplary embodiment of the present invention, 1) the acryl-based film may be manufactured by manufacturing the film by a melting extrusion method or a solution casting method using the acryl-based polymer and performing a stretching process.

The acryl-based polymer may be an acryl-based copolymer that includes an acryl-based monomer and an aromatic vinyl monomer, but is not limited thereto.

The acryl-based monomer may be a compound that has a double bond between carbons that are conjugated with the carbonyl group of the ester group, and its substituent group is not particularly limited. The acryl-based monomer that is disclosed in the present specification includes acrylate and an acrylate derivative, and it should be understood that it is a concept including alkylacrylate, alkylmethacrylate, alkylbutacrylate and the like. For example, examples of the acryl-based monomer include the compound that is represented by the following Formula 2.

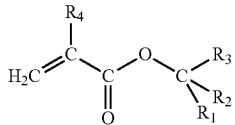

[Formula 2]

$R_1$, $R_2$ and $R_3$ are each independently a hydrogen atom, or a monovalent hydrocarbon group that includes or do not include a hetero atom and has 1 to 30 carbon atoms, and at least one of $R_1$, $R_2$ and $R_3$ may be an epoxy group; $R_4$ is a hydrogen atom or an alkyl group having 1 to 6 carbon atoms.

In detail, as the acryl-based monomer, methyl methacrylate, ethyl methacrylate, propyl methacrylate, n-butyl methacrylate, t-butyl methacrylate, cyclohexyl methacrylate, benzyl methacrylate, methoxyethyl methacrylate, ethoxyethyl methacrylate, butoxymethyl methacrylate, and oligomers thereof may be used, but it is not limited thereto.

The content of the acryl-based monomer in the acryl-based copolymer is preferably 40 to 99 wt %, more preferably 50 to 98 wt %, and even more preferably 60 to 97 wt %. In the case when the content of the acryl-based monomer is less than 40 wt %, the intrinsic high heat resistance and high transparency of the acryl-based polymer may not be sufficiently implemented, and in the case when it is more than 99 wt %, there may be a problem in that mechanical strength is decreased.

As the aromatic vinyl monomer, there may be styrene, α-methyl styrene, and 4-methyl styrene, and styrene is preferable, but it is not limited thereto.

The content of the aromatic vinyl monomer in the acryl-based copolymer is preferably 1 to 60 wt %, and more preferably 10 to 60 wt %.

The acryl-based copolymer may further include a maleic anhydride-based or maleimide-based monomer.

As the maleic anhydride-based or maleimide-based monomer, there may be maleic anhydride, maleimide, N-methyl maleimide, N-ethyl maleimide, N-propyl maleimide, and N-isopropyl maleimide, but it is not limited thereto.

The content of the maleic anhydride-based or maleimide-based monomer in the acryl-based copolymer is preferably 5 to 30 wt %, and more preferably 5 to 10 wt %. In the case when the content of the maleic anhydride-based or maleimide-based monomer is more than 30 wt %, since the brittleness of the film is increased, there may be a problem in that the film is easily broken.

In the retardation film according to the exemplary embodiment of the present invention, 1) the acryl-based film may further include a rubber component.

The rubber component may be an acryl rubber, a rubber-acryl-based graft type core-shell polymer, or a mixture thereof, but it is not limited thereto.

As the acryl rubber, there may be alkyl acrylate such as butyl acrylate, and 2-ethyl hexyl acrylate, and as the rubber-acryl-based graft type core-shell polymer, a particle in which butadiene, butyl acrylate or butyl acrylate-styrene copolymer-based rubber is used as a core, polymethyl methacrylate or polystyrene is used as a shell and a size is in the range of 50 to 400 nm may be used.

The content of the rubber component is preferably 1 to 20 parts by weight, more preferably 1 to 15 parts by weight, and even more preferably 1 to 10 parts by weight on the basis of 100 parts by weight of the acryl-based copolymer. In the case when the content of the rubber component is less than 1 part by weight, it may be impossible to implement excellent mechanical strength of the film, a problem in a treatment process occurs because the film is easily broken, and the optical performance is not sufficiently implemented. In addition, in the case when the content is more than 20 parts by weight, there is a problem in that the intrinsic high heat resistance and high transparency of the acryl-based copolymer may not be sufficiently implemented, and there may be a problem in processing because a haze occurs in a stretching process.

In the retardation film according to the exemplary embodiment of the present invention, the in-plane retardation value that is represented by Equation 1 of 1) the acryl-based film may be 50 to 300 nm, and the thickness retardation value that is represented by Equation 2 may be 50 to 300 nm.

For example, the in-plane retardation value that is represented by Equation 1 of 1) the acryl-based film may be 80 to 120 nm, and in this case, the film may implement a characteristic of Rth/Rin in the range of 1.3 to 1.5 [herein, Rth=(nz−nx)*d, and nx is a slow axis].

In the retardation film according to the exemplary embodiment of the present invention, 2) the negative C type material is a negative C type material that includes a repeating unit of Formula 1 and may be a material having a negative cellulose-based end group in Formula 1. A molecular weight may be in the range of 50,000 to 300,000, but is not limited thereto.

The negative C type material that includes the repeating unit of Formula 1 may be, for example, methylcellulose (MC), hydroxy propyl methyl cellulose (HPMC), hydroxy ethyl methyl cellulose (NEMC), or ethyl cellulose (EC).

In detail, it may be methyl cellulose in which R is H or $CH_3$; hydroxy propyl methyl cellulose in which R is H or $CH_3$ or $CH_2CH(OH)CH_3$; hydroxy ethyl methyl cellulose in which R is $(CH_2CH_2O)_xH,CH_3$ or H; or ethyl cellulose in which R is H or $C_2H_3$.

In the exemplary embodiment of the present invention, in the negative C type material that is used as the coating material and includes the repeating unit of Formula 1, since the glass transition temperature (Tg) is higher than that of the known liquid crystal by 40° C., durability is excellent, such that deterioration in durability which was a problem when the known liquid crystal is coated can be remarkably improved. In addition, a cost can be decreased by not using a known expensive liquid crystal but using the negative C type material having cost competitiveness that includes the repeating unit of Formula 1.

For example, in the case when the stretched PMMA film is used as 1) the acryl-based film, and the ethyl cellulose (EC) coating layer is used as 2) the coating layer of the negative C type material, negative phase implementation is the most excellent because of the thickness of the thin film in which the coating thickness is the thinnest and it is possible to provide optically upper/lower optimum compensation characteristic and durability.

In the retardation film according to the exemplary embodiment of the present invention, the in-plane retardation value that is represented by Equation 1 of 2) the coating layer of the negative C type material may be −5 to 5 nm, and the thickness retardation value that is represented by Equation 2 may be −20 to −200 nm.

For example, 2) the coating layer of the negative C type material may implement a characteristic in that the thickness retardation value that is represented by Equation 2 is in the range of −80 nm to −110 nm.

In the retardation film according to the exemplary embodiment of the present invention, the thickness of 2) the coating layer of the negative C type material may be more than 0 μm and 50 μm or less, but it is not limited thereto.

In the retardation film according to the exemplary embodiment of the present invention, the in-plane retardation value that is represented by Equation 1 of the entire retardation film is 50 to 300 nm, and more preferably 110 to 290 nm. In addition, the thickness retardation value that is represented by Equation 2 is 10 to 300 nm, and more preferably 10 to 190 nm.

In addition, the retardation film according to the exemplary embodiment of the present invention is characterized in that a $N_z(R_{th}/R_{in})$ value that is a ratio of the thickness retardation value to the in-plane retardation value is less than 1. In general, the retardation value of the acryl-based retardation film has a ratio of $R_{th}:R_{in}=1:1$, but in the retardation film according to the exemplary embodiment of the present invention, the $N_z(R_{th}/R_{in})$ value that is a ratio of the thickness retardation value to the in-plane retardation value is less than 1, such that it may be used as a retardation film of various modes of liquid crystal displays, particularly various IPS (in-plane switching) modes of liquid crystal displays. For example, the $N_z(R_{th}/R_{in})$ value may be 0.2 to 0.7.

In the retardation film according to the exemplary embodiment of the present invention, the thickness of the entire retardation film may be 20 to 80 μm, but it is not limited thereto.

In the retardation film according to the exemplary embodiment of the present invention, 2) the coating layer of the negative C type material may exist on one side or both sides of 1) the acryl-based film.

The retardation film according to an exemplary embodiment of the present invention may further include a buffer layer between 1) the acryl-based film, and 2) the coating layer of the negative C type material.

The buffer layer acts to improve adhesion strength between the acryl-based film and the coating layer of the negative C type material, and suppress solvent erosion to the substrate.

The buffer layer may include a compound that is selected from the group consisting of an acrylate polymer, a methacrylate polymer, and an acrylate/methacrylate copolymer that can be cured by UV or heat, but is not limited thereto.

The buffer layer may be formed in a thickness range in which erosion does not occur by the solvent and coating processability is good, and in more detail, the thickness of the buffer layer may be 0.1 to 5 μm.

The buffer layer may be manufactured by manufacturing the solution using the solvent, coating the solution on the acryl-based film by the method such as flow coating, roll coating, bar coating, and spray coating, drying the solvent, and performing UV curing or heat curing.

The buffer layer may be added in conjunction with the compound that includes a soft group such as urethane in order to improve the brittleness. In addition, in order to improve the adhesion strength, a silicon oligomer solution which have two or more acrylate functional groups by hydrolyzing a silicon coupling agent and an oil colloid silica that can be cured by UV or heat; an acrylate oligomer solution; and an acrylate monomer solution; and a composition of photoinitiator or thermal initiator (Korean Unexamined Patent Application Publication No. 2002-0020599) may be further included The retardation film according to the exemplary embodiment of the present invention may further include an additive such as a UV absorbing agent, a plasticizer, and a retardation promoter.

The UV absorbing agent may be used alone or in admixture of two or more kinds. As the UV absorbing agent, there may be a triazine-based UV absorbing agent, a triazole-based UV absorbing agent, and a HALS (hindered amine light stabilizer)-based UV absorbing agent, but it is not limited thereto. As the triazine-based UV absorbing agent, there may be commercialized Tinuvin 360, Tinuvin 1577 (Ciba Chemicals), Cyasorb UV-1164, Cyasorb UV-2908, and Cyasorb UV-3346 (Cytec), as the triazole-based UV absorbing agent, there may be Tinuvin 384, Tinuvin 1130, Cyasorb UV-2337, and Cyasorb UV-5411, and as the HALS-based UV absorbing agent, there may be Cyasorb UV-3853.

In addition, a method for manufacturing the retardation film according to the exemplary embodiment of the present invention includes a) preparing an acryl-based film, and b) coating a negative C type material on at least one side of the acryl-based film.

In the method for manufacturing the retardation film according to the exemplary embodiment of the present invention, since the detailed description on the acryl-based film of step a) and the negative C type material of step b) is the same as the above description, the detailed description will be omitted.

In the method for manufacturing the retardation film according to the exemplary embodiment of the present invention, the method for forming the coating layer of step b) is not particularly limited, but a method that is known in the art may be used, and for example, flow coating, roll coating, bar coating, and spray coating may be used.

In addition, the method for manufacturing the retardation film according to the exemplary embodiment of the present invention may further include, after the step a), forming a buffer layer on at least one side of the acryl-based film.

In addition, the present invention provides an IPS (in-plane switching) mode liquid crystal display device that includes one or more of the retardation films.

A liquid crystal display device that includes one or more of the retardation films will be described in detail below.

In a liquid crystal display device that includes a liquid crystal cell and a first polarizing plate and a second polarizing plate provided on both sides of the liquid crystal cell, the retardation film may be provided between the liquid crystal cell and the first polarizing plate and/or the second polarizing plate. That is, one or more of the retardation films may be provided between the first polarizing plate and the liquid crystal cell, between the second polarizing plate and the liquid crystal cell, or between the first polarizing plate and the liquid crystal cell and between the second polarizing plate and the liquid crystal cell.

The first polarizing plate and the second polarizing plate may include a protective film on a side or both sides thereof. As the inner protective film, there may be a triacetate cellulose (TAC) film, a polynorbornene-based film that is manufactured by using the ring opening metathesis polymerization (ROMP), a HROMP (ring opening metathesis polymerization followed by hydrogenation) polymer film that is obtained by hydrogenating again the ring opened cyclic olefine polymer, a polyester film, or a polynorbornene film that is manufactured by using the addition polymerization, and the like. Besides, a film that is made of a transparent polymer material may be used as the protective film, but it is not limited thereto.

In addition, the preset invention includes a polarizing film and provides an integrated polarizing plate including a retardation film according to the present invention as the protective film on one side or both sides of the polarizing film.

If the retardation film according to the present invention is provided on only one side of the polarizing film, a protective film which is known in the related art may be provided on another side thereof.

As the polarizing film, a film that is made of polyvinylalcohol (PVA) including iodine or dichromatic dye may be used. The polarizing film may be manufactured by dyeing iodine or dichromatic dye on the PVA film, but its manufacturing method is not particularly limited. In the specification, the polarizing film does not include the protective film, and the polarizing plate includes the polarizing film and the protective film.

In the integrated polarizing plate according to the present invention, the protective film and the polarizing film may be combined with each other by using a method known in the art.

For example, the combination of the protective film and the polarizing film may be performed according to an attachment method using an attaching agent. That is, the attaching agent is coated on the surface of the PVA film that is the protective film of the polarizing film or the polarizing film by using a roll coater, a gravure coater, a bar coater, a knife coater, a capillary coater, or the like. Before the attaching agent is completely dried, the protective film and the polarizing film are combined with each other using heat pressing or pressing at normal temperature by means of a combination roll. In a case where the hot melt attaching agent is used, the heating pressing roll should be used.

Examples of the attaching agent which is capable of being used to combine the protective film and the polarizing plate include a one- or two-liquid type PVA attaching agent, a polyurethane attaching agent, an epoxy attaching agent, a styrene-butadiene rubber (SBR) attaching agent, or a hot melt attaching agent but are not limited thereto. In the polyurethane attaching agent is used, it is preferable to use a polyurethane attaching agent that is manufactured by using an aliphatic isocyanate compound that is not yellowed by light. In a case where an attaching agent for one- or two-liquid type dry laminate or an attaching agent that has relatively low reactivity to isocyanate and hydroxyl group is used, a solution adhesion agent that is diluted by an acetate solvent, a ketone solvent, an ether solvent or an aromatic solvent may be used. In this case, the attaching agent may be a low viscosity type having the viscosity of 5,000 cps or less. The above attaching agent has excellent storage stability, and the light transmittance at 400 to 800 nm may be 90% or more.

If an adhesion agent has sufficient adhesion strength, it may be also used. The adhesion agent may be sufficiently cured by heat or UV after the lamination and mechanical strength is improved to the level of the case of attaching agent, and surface attachment strength is also large, such that it has adhesion strength so that it is not stripped as long as any one of both films to which the adhesion agent is attached is damaged.

Specific examples of the usable adhesive may include natural rubber, synthetic rubber or elastomer, a vinyl chloride/vinyl acetate copolymer, polyvinyl alkyl ether, polyacrylate or denatured polyolefin adhesive, and a curable adhesive containing a curing agent such as isocyanate, which have excellent optical transparency.

In addition, the present invention provides a liquid crystal display device including the integrated polarizing plate.

Even in a case where the liquid crystal display device according to the present invention includes the integrated polarizing plate described above, one or more retardation films according to the present invention may be additionally provided between the polarizing plate and the liquid crystal cell.

MODE FOR INVENTION

Hereinafter, exemplary Examples will be described in order to help understanding of the present invention. However, the following Examples are set forth to illustrate the present invention, but the scope of the present invention is not limited thereto.

Example 1

After the unstretched PMMA sheet containing polystyrene of less than 10% was extruded, the transversely stretched film (c) in which $R_{in}$ was 105 nm and $R_{th}$ was 150 nm was manufactured by stretching it in a Tenter direction by about 3 times in the TD stretching machine. The primer layer (b) coating treatment was performed by coating the polyurethane-based UV curable resin on the surface of the transversely stretched film, and coating the methyl cellulose (MC) resin so that the retardation value of the coating layer was −52 nm. Methyl cellulose (MC) was prepared in a liquid having a concentration of 15% in water at 90° C., cooled to normal temperature, and coated in a thickness of about 39 μm. It was manufactured so that the retardation value of the final retardation film, $R_{in}$ was 105 nm and $N_z$ was 0.93. This retardation film was attached to the PVA stretched diode that contained iodine and was stretched by 5 times by using the aqueous attachment agent, dried at 90° C., and cooled. The upper polarizing plate was manufactured by performing the adhesion coating (g) on the retardation film layer of the polarizing plate in a semi-product state. In the case of the lower polarizing plate, the minimum contrast optical characteristics were evaluated by manufacturing the general polarizing plate in which the retardation in the polarizing diode was zero (f), attaching it to upper and lower sides of the IPS cell in which the retardation value was 290 nm, and using the EZ Contrast system (Model: ELABO-423EZ) apparatus at the inclined angle of 60°. The results are described in Table 1.

Examples 2 to 4

The same process as Example 1 was performed, except that hydroxy propyl methyl cellulose (HPMC) was coated on the primer layer (b) instead of methylcellulose (MC) as the negative C type material and a change was performed as described in Table 1.

Examples 5 to 7

The same process as Example 1 was performed, except that hydroxy ethyl methyl cellulose (HEMC) was coated on the primer layer (b) instead of methylcellulose (MC) as the negative C type material and a change was performed as described in Table 1.

Examples 8 to 10

The same process as Example 1 was performed, except that ethyl cellulose (EC) was coated on the primer layer (b) instead of methylcellulose (MC) as the negative C type material in such a way that ethyl cellulose (EC) was prepared in a liquid having a concentration of 15% at a ratio of toluene/ethanol of 8/2 wt %, cooled to normal temperature, and coated in a thickness of about 7 to 10 μm, and a change was performed as described in Table 1.

Comparative Example 1

The raw material pellet was obtained by providing 7 parts by weight of the butyl acrylate-methyl methacrylate resin graft type core-shell polymer on the basis of 100 parts by weight of the acryl-based resin (Tg=129° C.) that included 75 wt % of methyl methacrylate, 11 wt % of maleic anhydride, and 14 wt % of styrene from the raw material hopper to the extruder of 60 φ in which nitrogen was substituted, and melting it at 250° C., and the film having the thickness of 100 μm was manufactured by vacuum drying the obtained raw material pellet, melting it by the extruder at 250° C., passing it through the coat hanger type of T-die, and passing it through chrome plating casting rolls and dry rolls. The retardation film having the thickness of 60 μm was obtained by stretching the manufactured film at 110° C. in a transverse direction by 100%. The in-plane retardation of the retardation film was 105 nm, and the thickness retardation thereof was 150 nm.

TABLE 1

|  | Acryl-based substrate layer | | Negative C coating layer | | | Substrate layer + coating layer | |
|---|---|---|---|---|---|---|---|
|  | $R_{in}$ (nm) | $R_{th}$ (nm) | Thickness (μm) | $R_{in}$ (nm) | $R_{th}$ (nm) | $N_z$ ($R_{th}/R_{in}$) | Light characteristic minimum contrast |
| Comparative Example 1 | 105 | 150 | — | — | — | 1.43 | 8 |
| Example 1 | 105 | 150 | 39 | 0.2 | −52 | 0.93 | 10 |
| Example 2 | 105 | 150 | 23 | 0.2 | −53 | 0.92 | 10 |
| Example 3 | 105 | 150 | 29 | 0.3 | −59 | 0.87 | 12 |
| Example 4 | 105 | 150 | 41 | 0.4 | −73 | 0.73 | 20 |
| Example 5 | 105 | 150 | 21 | 0.2 | −60 | 0.86 | 12 |
| Example 6 | 105 | 150 | 29 | 0.1 | −73 | 0.73 | 20 |
| Example 7 | 105 | 150 | 38 | 0.2 | −77 | 0.70 | 20 |
| Example 8 | 105 | 150 | 7 | 0.2 | −85 | 0.62 | 25 |
| Example 9 | 105 | 150 | 9 | 0.3 | −100 | 0.48 | 40 |
| Example 10 | 105 | 150 | 10 | 0.2 | −110 | 0.38 | 60 |

Through Table 1, it can be seen that in the case of Comparative Example 1, the $N_z$ ($R_{th}/R_{in}$) value is 1.43 that is more than 1, but in the case of Examples 1 to 10, it is less than 1 which is smaller than that of Comparative Example 1.

In addition, in the case of Examples 1 to 10 according to the exemplary embodiment of the present invention, the contrast having the inclined angle of 60° was measured, resulting in the finding that through Table 1, the contrast was 10 to 60 which was largely higher than 8 of Comparative Examples 1.

Figure 3:
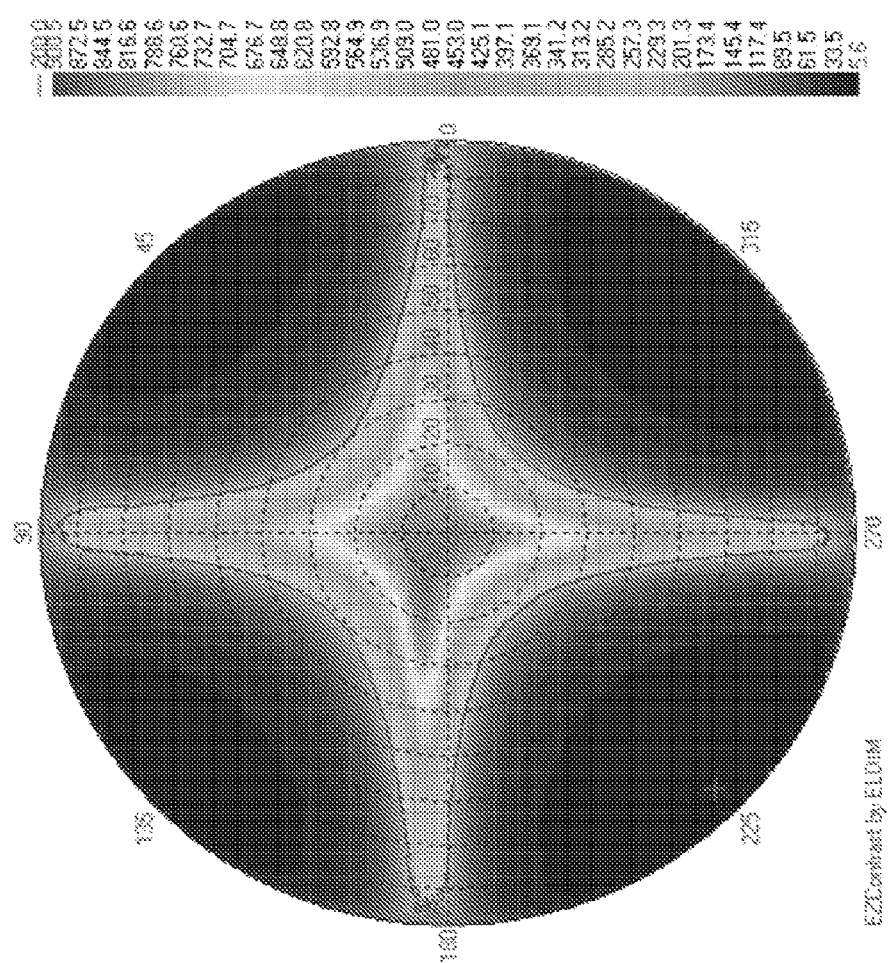
FIG. 3 illustrates the minimum contrast light characteristic evaluation data of Comparative Example 1.
Figure 4:
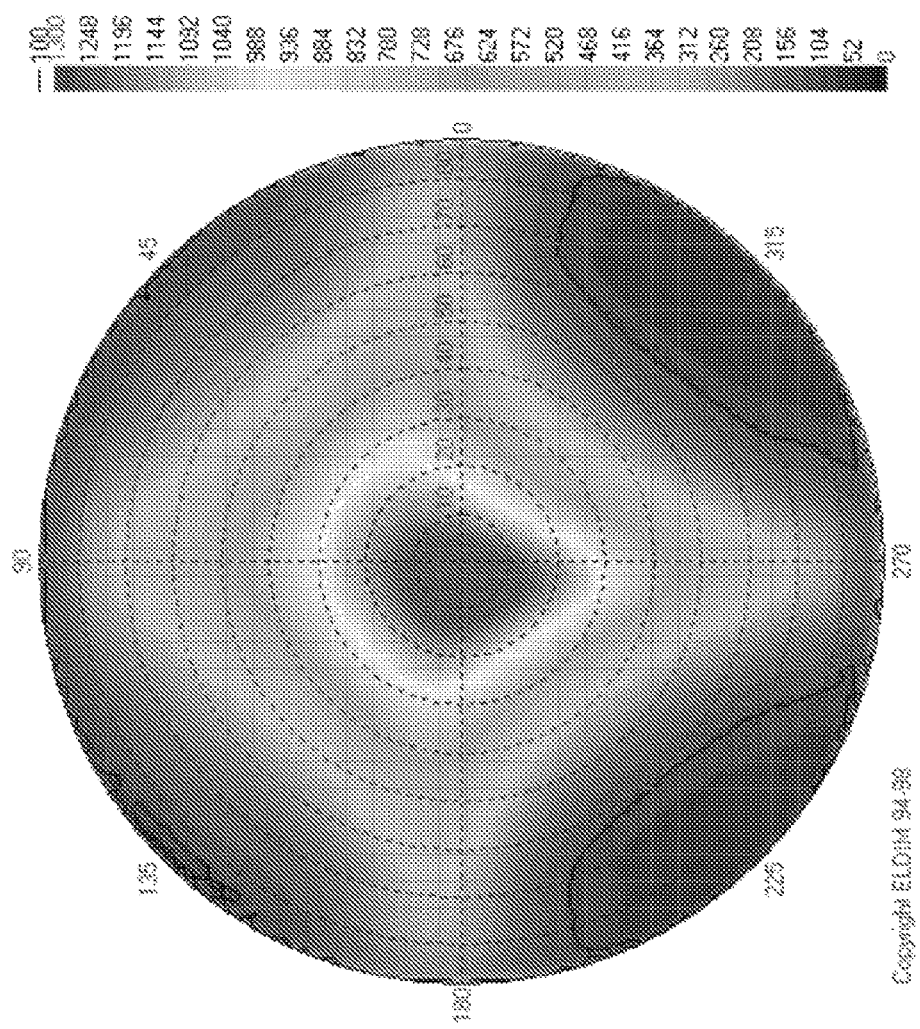
FIG. 4 illustrates the minimum contrast light characteristic evaluation data of Example 10.

When the picture of the LCD (liquid crystal display) is observed, even if it is observed at a predetermined viewing angle in addition to a front side, the same black texture and quality as the front side should be ensured, which shows an improvement effect of viewing angle performance, and in order to confirm this, as shown in FIGS. 3 and 4, the omni-directional contrast maps of Comparative Example 1 and Example 10 were measured. In addition, the contrast that had the inclined angle of 60° and was the blind spot having the worst viewing angle characteristic of the LCD observer was compared and measured, which is shown in Table 1.

As described above, through FIGS. 3 and 4 and Table 1, in views of the viewing angle contrast, it can be seen that the quality in black texture of the entire picture is very excellent even though the LCD is observed in various angles in addition to a front side because Example 10 is largely improved as compared to Comparative Example 1.

The invention claimed is:

1. A retardation film for an IPS (in-plane switching) mode liquid crystal display, comprising:

1) an acryl-based film, and 2) a coating layer of a negative C type cellulose-based material that includes a repeating unit of the following Formula 1, wherein an in-plane retardation value of the entire retardation film that is represented by the following Equation 1 is 50 to 300 nm, a thickness retardation value of the entire retardation film that is represented by the following Equation 2 is 10 to 190 nm, and a $N_z$ ($R_{th}/R_{in}$) value that is a ratio of the thickness retardation value to the in-plane retardation value is less than 1,

[Formula 1]

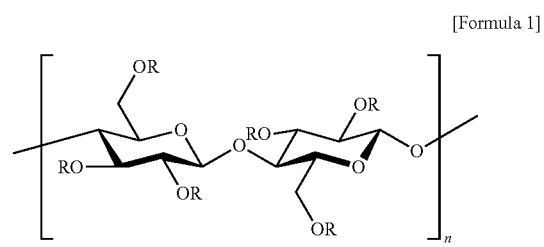

wherein Rs are the same as or different from each other, and each independently selected from —H, —CH$_3$, —CH$_2$CH(OH)CH$_3$, —CH$_2$CH$_2$OH, and —CH$_2$CH$_3$, and n is 100 to 300, $R_{in}=(n_x-n_y)\times d$ [Equation 1]

$R_{th}=(n_z-n_y)\times d$ [Equation 2]

$n_x$ is the refractive index in the direction in which the refractive index is the highest in the plane of the film,
$n_y$ is the refractive index in the vertical direction in respects to $n_x$ in the plane of the film,
$n_z$ is a thickness refractive index, and
d is a thickness of the film.

2. The retardation film according to claim 1, wherein 1) the acryl-based film includes an acryl-based polymer.

3. The retardation film according to claim 2, wherein the acryl-based polymer is an acryl-based copolymer that includes an acryl-based monomer and an aromatic vinyl monomer.

4. The retardation film according to claim 3, wherein the acryl-based copolymer further includes a maleic anhydride-based or a maleimide-based monomer.

5. The retardation film according to claim 1, wherein 1) the acryl-based film includes a rubber component.

6. The retardation film according to claim 5, wherein the rubber component is selected from the group consisting of an acryl rubber, a rubber-acryl-based graft type core-shell polymer, and a mixture thereof.

7. The retardation film according to claim 1, wherein in 1) the acryl-based film an in-plane retardation value that is represented by Equation 1 is 50 to 300 nm, and a thickness retardation value that is represented by Equation 2 is 50 to 300 nm.

8. The retardation film according to claim 1, wherein 2) the negative C type material includes methyl cellulose (MC), hydroxy propyl methyl cellulose (HPMC), hydroxyl ethyl methyl cellulose (HEMC), or ethyl cellulose (EC).

9. The retardation film according to claim 1, wherein in 2) the coating layer of the negative C type material an in-plane retardation value that is represented by Equation 1 is −5 to 5 nm, and a thickness retardation value that is represented by Equation 2 is −20 to −200 nm 10. The retardation film according to claim 1, wherein the thickness of 2) the coating layer of the negative C type material is more than 0 μm and 50 μm or less.

11. The retardation film according to claim 1, wherein the thickness of the retardation film for the IPS mode liquid crystal display is 20 to 80 μm.

12. The retardation film according to claim 1, further comprising a buffer layer between 1) the acryl-based film, and 2) the coating layer of the negative C type material.

13. The retardation film according to claim 12, wherein the buffer layer includes a compound that is selected from the group consisting of an acrylate polymer, a methacrylate polymer, and an acrylate/methacrylate copolymer.

14. The retardation film according to claim 12, wherein the thickness of the buffer layer is 0.1 to 5 μm.

15. An IPS (in-plane switching) mode liquid crystal display comprising:
one or more retardation films for an IPS (in-plane switching) mode liquid crystal display according to claim 1.

16. An integrated polarizing plate for an IPS (in-plane switching) mode liquid crystal display, comprising:
a polarizing film, and
the retardation film according to claim 1 on one side or both sides of the polarizing film as a protective film.

17. An IPS (in-plane switching) mode liquid crystal display comprising:
the integrated polarizing plate for an IPS (in-plane switching) mode liquid crystal display of claim 16.

18. A method for manufacturing a retardation film for an IPS (in-plane switching) mode liquid crystal display, comprising:
a) preparing an acryl-based film, and
b) coating a negative C type cellulose-based material that includes a repeating unit of the following Formula 1 on at least one side of the acryl-based film,
wherein in the retardation film an in-plane retardation value of the entire retardation film that is represented by the following Equation 1 is 50 to 300 nm, a thickness retardation value of the entire retardation film that is represented by the following Equation 2 is 10 to 190 nm, and a $N_z(R_{th}/R_{in})$ value that is a ratio of the thickness retardation value to the in-plane retardation value is less than 1,

[Formula 1]

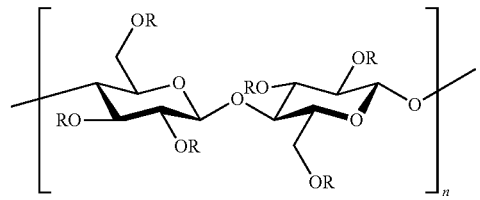

wherein Rs are the same as or different from each other, and each independently selected from —H, —CH$_3$, —CH$_2$CH(OH)CH$_3$, —CH$_2$CH$_2$OH, and —CH$_2$CH$_3$, and n is 100 to 300, $R_{in}=(n_x-n_y)\times d$ [Equation 1]

$R_{th}=(n_z-n_y)\times d$ [Equation 2]

$n_x$ is the refractive index in the direction in which the refractive index is highest in the plane of the film,
$n_y$ is the refractive index in the vertical direction in respects to $n_x$ in the plane of the film,
$n_z$ is a thickness refractive index, and
d is a thickness of the film.

19. The method for manufacturing a retardation film according to claim 18, further comprising, after the step a), forming a buffer layer on at least one side of the acryl-based film.

20. The method for manufacturing a retardation film according to claim 18, wherein 2) the negative C type material includes methyl cellulose (MC), hydroxy propyl methyl cellulose (HPMC), hydroxyl ethyl methyl cellulose (HEMC), or ethyl cellulose (EC).

* * * * *